United States Patent [19]

Bauer et al.

[11] Patent Number: 4,495,834
[45] Date of Patent: Jan. 29, 1985

[54] ADJUSTABLE STEERING COLUMN

[75] Inventors: James J. Bauer, Richland; Vilnis Strautins, Kalamazoo, both of Mich.

[73] Assignee: Clark Equipment Company, Buchanan, Mich.

[21] Appl. No.: 351,084

[22] Filed: Feb. 22, 1982

[51] Int. Cl.³ .............................................. B62D 1/18
[52] U.S. Cl. ........................................ 74/493; 74/527; 280/775; 403/324; 403/328
[58] Field of Search .................. 74/493, 527; 280/775; 403/322, 324, 328, 327, 109

[56] References Cited

U.S. PATENT DOCUMENTS

| | | | |
|---|---|---|---|
| 1,619,980 | 3/1927 | Kelsey | 74/493 |
| 2,744,419 | 5/1956 | Chayne | 74/493 |
| 2,910,887 | 11/1959 | Helms | 74/493 |
| 3,032,134 | 5/1962 | Banker | 280/775 |
| 3,302,478 | 2/1967 | Pauwels | 74/493 |
| 3,306,639 | 2/1967 | Lyon | 403/109 X |
| 3,316,774 | 5/1967 | Vogelgesang | 74/493 |
| 3,533,302 | 10/1970 | Hansen | 74/493 |
| 3,628,396 | 12/1971 | Grobowski | 74/493 |
| 3,747,966 | 7/1973 | Wilkes et al. | 403/322 X |
| 4,179,137 | 12/1979 | Burke | 280/775 |
| 4,209,074 | 6/1980 | York | 280/775 |
| 4,244,236 | 1/1981 | Sylvester | 74/493 |
| 4,244,237 | 1/1981 | Sprunger | 74/493 |

FOREIGN PATENT DOCUMENTS

| | | | |
|---|---|---|---|
| 3016212 | 10/1981 | Fed. Rep. of Germany | 74/493 |
| 435 | of 1903 | United Kingdom | 74/493 |

Primary Examiner—Allan D. Herrmann
Attorney, Agent, or Firm—John C. Wiessler

[57] ABSTRACT

An adjustable steering assembly for vehicles pivotable forwardly and rearwardly about upper and lower pivots, the upper pivot being operably connected to the steering column by a swingable link which is adapted to actuate along said steering column an axially slidable adjustment sleeve assembly. The sleeve assembly includes a manually adjustable spring actuator for adjusting axially of the steering column the position of a detent device which in turn allows angular adjustment of the steering column for the comfort of operators of different sizes and heights and to provide a fully forward tilted position at which improved access to vehicle components is provided.

5 Claims, 4 Drawing Figures

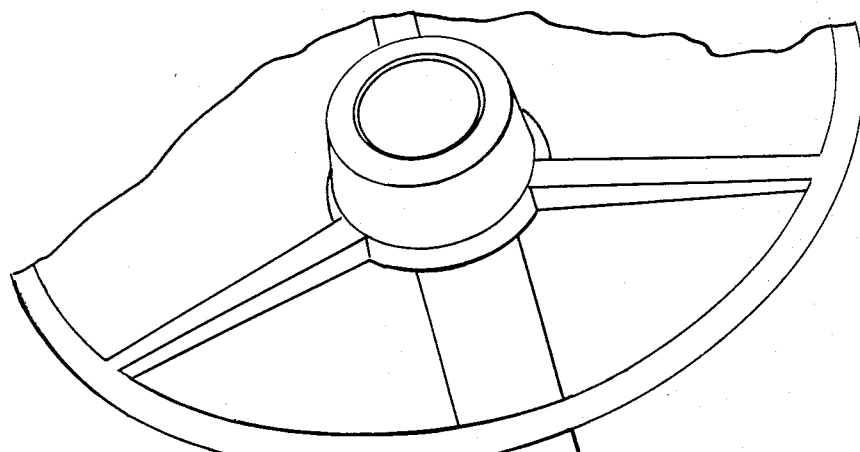
FIG. 3
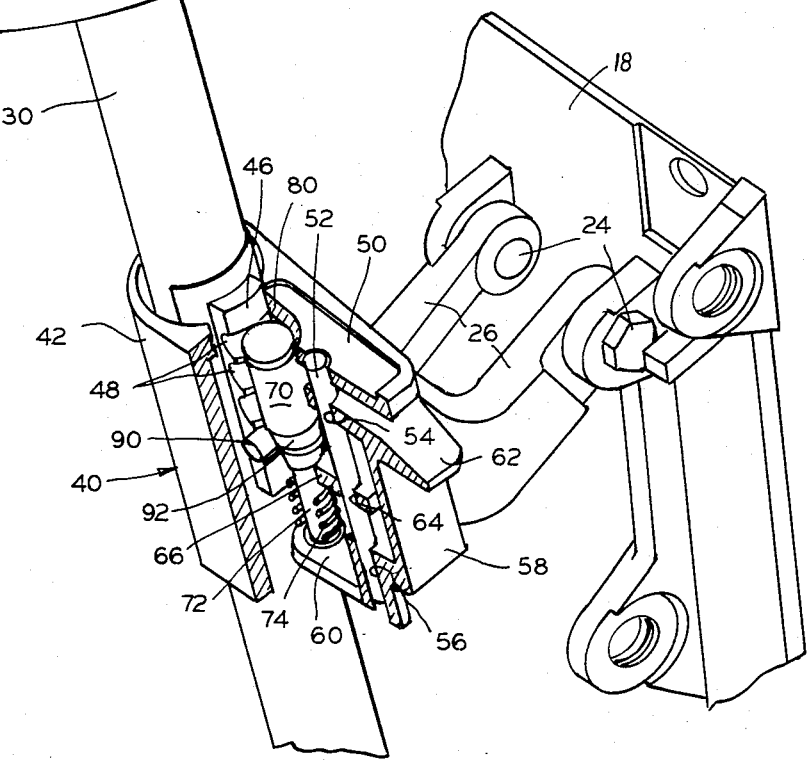
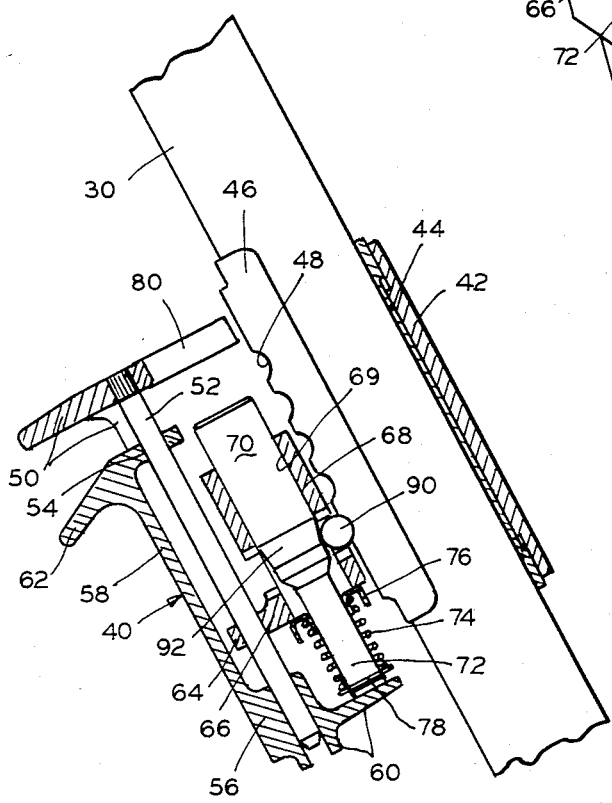
FIG. 4

ADJUSTABLE STEERING COLUMN

BACKGROUND OF THE INVENTION

This invention relates generally to vehicle steering columns and more particularly to an improved pivoted steering column having a plurality of selectively adjustable positions available to the driver to suit requirements.

The advantages of adjustable steering columns have been long known, and a variety of devices have been proposed and utilized heretofore for the purpose of adjusting the position of the steering wheel and column to maximize the comfort of the driver. Exemplary prior art in which the steering column can be moved both axially and pivotally is disclosed in U.S. Pat. Nos. 3,302,478 to Pauwels, 3,628,396 to Grobowski and 4,179,137 to Burke. U.S. Pat. No. 3,032,134 to Banker discloses a steering column adjustable pivotally only, while U.S. Pat. No. 4,209,074 to York discloses a steering column adjustable fore and aft and vertically. Exemplary U.S. Pat. Nos. 2,744,419 to Chayne and, 3,316,774 to Vogelgesang disclose steering columns adjustable axially only.

SUMMARY

This invention provides improvements in a pivotally adjustable steering column assembly wherein the column assembly is mounted from a first upper pivot connection to a swingable link which is mounted pivotally at its opposite end from the vehicle; it is simultaneously pivotable about a spaced lower pivot also mounted from the vehicle, the first upper pivot being connected to an adjustable detent device and latch assembly movable axially of the steering column. The geometry of the assembly permits the steering column assembly to be pivotally adjusted longitudinally of the vehicle in a predetermined relationship to the three above-named pivots to various positions associated with the detent and latch assembly as the latter assembly is actuated axially of the column assembly by the swinging link during fore and aft pivotal movement of the steering column.

It is an important object of the invention to both simplify the structure of pivotally adjustable steering columns and to reduce the cost thereof, as well as to improve upon the support structure and geometry of movement of vehicle steering columns.

Another important object is to provide ease of adjustment to different comfort settings for operators who vary in size and to provide ease of access for the servicing and maintenance of vehicular components by tilting the steering column out of the access area.

BRIEF DESCRIPTION OF THE DRAWINGS

FIG. 3 is a partial cut-away view in perspective of the steering assembly; and

FIG. 4 is an enlarged partial view in cross-section an adjustment assembly mounted on the steering column as shown in FIG. 2.

DESCRIPTION OF THE PREFERRED EMBODIMENT

Figure 1:
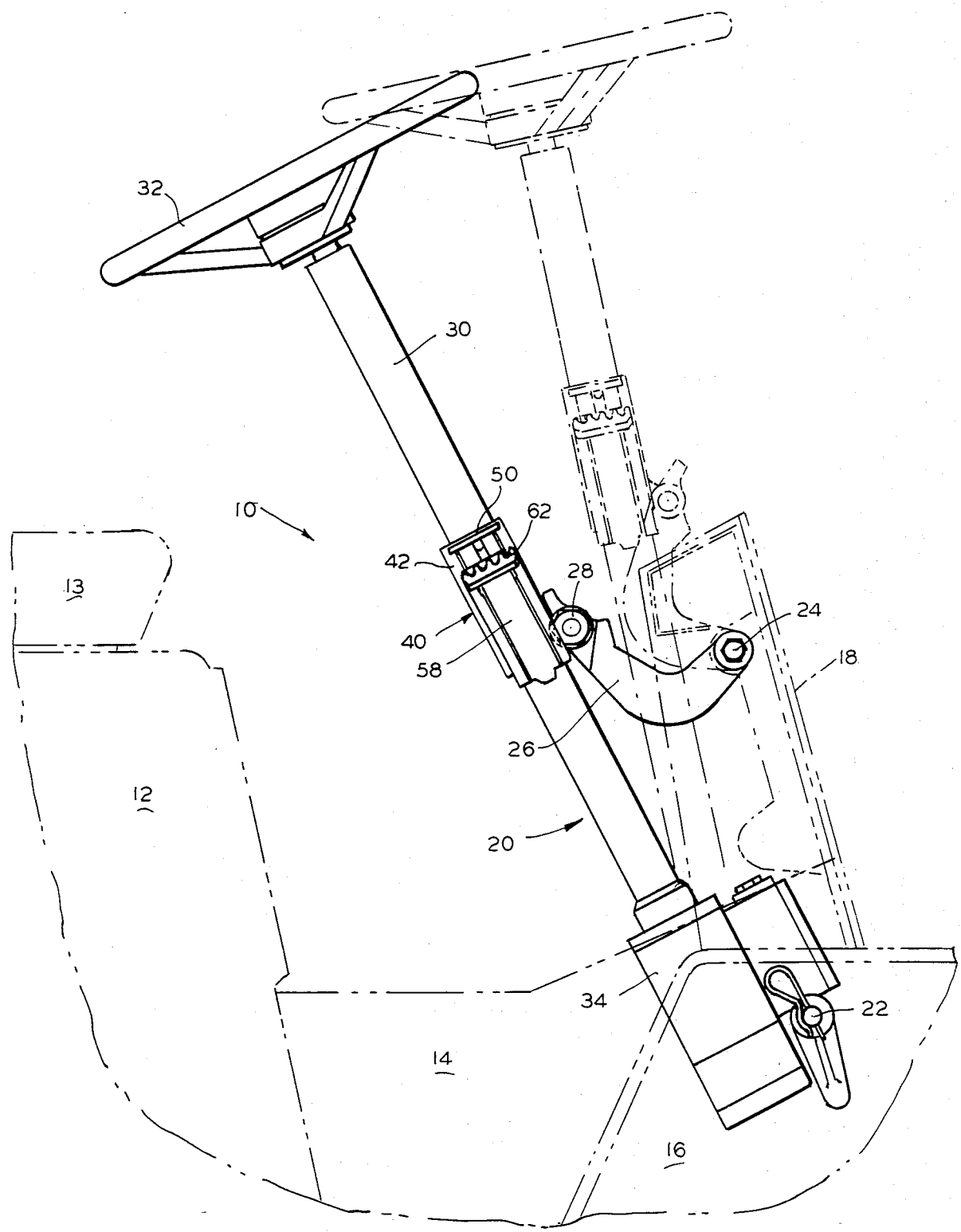
FIG. 1 is a view in side elevation, partly broken away, of the steering assembly as installed on a vehicle frame, such as a lift truck, and showing a steering assembly in different positions of adjustment.
Figure 2:
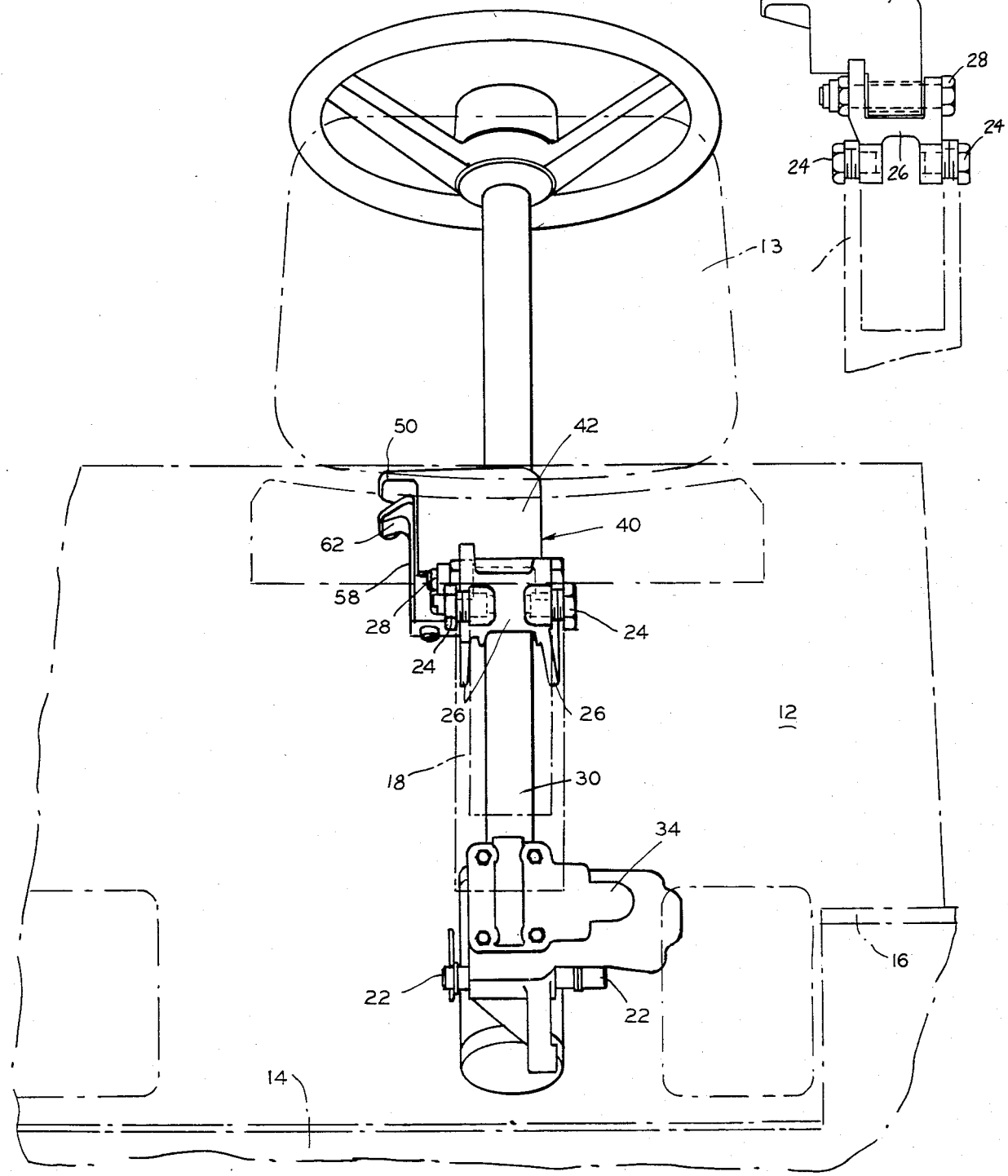
FIG. 2 is a front elevation view of FIG. 1.

A fragmentary and partially phantom view of an exemplary operator's compartment in an industrial lift truck is shown at numeral 10 comprising a body or hood portion 12 shown in operative position for covering a prime mover or primary energy source and related vehicular components, an operator's seat 13 mounted on hood 12, a floor and frame portion 14, a fender portion 16, a cowling 18 as shown in FIG. 1 only, and a steering column and wheel assembly 20 supported from a lower frame supported pivot pin 22, an upper cowling mounted pivot pin 24 and a pair of swingable parallel link members 26 which are pivotally connected to the steering column at a pivot pin 28.

A hollow cylindrical steering column 30 has mounted at its one end a steering wheel 32 which is suitably connected by control means, not shown, which extend through the column to a steering gear assembly 34 mounted at the opposite end of the column and adapted, as shown, to pivot with the steering column assembly. The steering gear 34 is connected by suitable means, not shown, to steer wheels at the rear of the truck.

Mounted for longitudinal sliding movement on the steering column is a steering column adjustment assembly 40 which is supported from pivot pin 28 in manually adjustable sliding relation to the steering column. It includes a sliding collar 42 which partially surrounds column 30 and which has an inner bearing surface member 44 which extends peripherally around column 30 a distance which subtends an angle greater than 180°. A locking bar 46 having a plurality of grooves 48 is secured rigidly to the column 30 with relation to which the adjustment assembly 40 has different adjustment positions as determined by the number and spacing of grooves 48, as will become apparent below. Integral with the collar 42 is an upper and outwardly projecting member 50 having a downwardly projecting pin 52 in parallel with column 30 and secured at the top thereof to member 50; the pin extends through aligned and spaced openings 54 and 56 in an adjustment handle 58 having inwardly and outwardly projecting members 60 and 62 at the bottom and top, respectively, of the handle which is thus supported on pin 52 and from collar 42. Collar 42 surrounds column 30 except for a cutout to accommodate handle 58. Pin 52 extends also through an opening 64 in an outwardly projecting portion 66 of an inner housing 68 which is suitably secured to adjacent inner surface portions of collar 42 and which contains in an opening 69 therethrough an actuatable taper pin 70. Pin 70 extends downwardly thereof in a reduced diameter portion 72 which is adapted to contact and be actuated by inward projection 60. Taper pin 70 is urged downwardly by a spring 74 mounted between a spring retainer 76 and a washer 78 secured to the lower end of pin portion 72. An opening 80 in member 50 allows access to pin 70 and upward movement of the pin into the opening when the spring 74 is compressed. Spring 74 may be compressed until upper collar projection 50 is contacted by adjustment member 62, and may extend until projecting member 62 contacts inner housing 68.

A cylindrical detent pin 90 is caught between a tapered section 92 of pin 70 and the lower one of notches 48, as shown. In the position of the ball detent illustrated the steering column assembly is adjusted to its rearwardmost position as shown in solid lines in FIG. 1.

In operation, to adjust the column assembly to its forwardmost position, as shown in broken lines in FIG. 1, the driver first releases the latching mechanism by lifting handle 62 to its uppermost position at which it abuts exterior housing portion 50 which causes member 60 to lift sliding pin 70 to a position against return spring 74 a distance which indexes the smaller diameter pin portion 72 to a position opposite detent pin 90, from which position any forward force input at the steering wheel 32 causes a force to be applied to pin 90 which, due to the geometry of the column assembly including swinging link 26 and the pivots 22, 24 and 28, causes pin 90 in its released position from lower groove 48 to roll upwardly along locking bar 46. The lockable sliding collar and latch assembly 42,58 is thus freed to slide upwardly along column 30 actuated by the force imparted to swinging link 26 in an arc of travel having a radius equal to the distance between the centers of pivots 24 and 28, thus constraining the motion of the sliding latch assembly to predetermined limits and effecting a range of movement in the embodiment disclosed herein as shown in FIG. 1. In other words, any forward or rearward force input at steering hand wheel 32 causes a reaction force to be set up between pivots 24 and 28 which, with the proper geometry, causes the assembly 42,58 to move up or down along the steering column (movement upwardly in the above example) when handle 62 is actuated upwardly as aforesaid. When the operator has indexed the hand wheel 32 and column 30 to a comfortable position he releases handle 62. This allows the return spring 74 to force the larger diameter tapered land of pin 70 against pin 90 which causes the ball to be forced against the latching bar 46. Any further forward or backward force or motion input at the hand wheel 32 causes the pin 90 to be indexed opposite an adjacent groove in the latching bar 46. When this occurs the return spring 74 forces pin 70 to index a larger diameter locking land thereof opposite the pin detent and adjacent groove which locks the assembly 40 into a selected position. As illustrated in FIG. 4, there are five positions to which the steering column assembly can be adjusted; four such positions are shown in FIG. 3.

As has been noted, the steering column 30 and hand wheel 32 are disclosed as being rigidly attached to the steering gear assembly 34, the steering gear assembly being attached to the vehicle frame by means of pivot 22. The steering gear assembly thus also describes an arc of travel when column 30 is adjusted. Such design could be readily modified to provide a fixed position steering gear not connected to pivot with the steering column assembly whereby only the latter assembly would be adjustable as aforesaid it being connected to the steering gear assembly by, for example, a flexible torque-transmitting joint between the column 30 and gear assembly.

Thus, we have provided a relatively simple, rugged and readily supported adjustable steering column assembly via three primary pivots related thereto and a swinging link actuating an adjustable latch assembly for the purposes aforesaid.

Although we have described and illustrated a preferred embodiment of our invention, it will be understood by those skilled in the art that modifications may be made in the structure, form and relative arrangement of parts without necessarily departing from the spirit and scope of the invention. Accordingly, it should be understood that we intend to cover by the appended claims all such modifications which fall within the scope of our invention.

We claim:

1. An adjustable steering column assembly for vehicles having a hand wheel and steering column for steering the vehicle pivotally adjustable forwardly and rearwardly of the vehicle, a first pivot fixed in relation to the vehicle on which the steering column is mounted and about which it is adjustable, a second pivot located above the steering column and fixed in relation to the vehicle, a third and movable pivot operatively connected to the steering column and connection to said second pivot by a swingable link, said third pivot being connected to a latch assembly which is mounted on the steering column and is slidable longitudinally thereof, said latch assembly including a collar and housing slidable along the steering column and extending outwardly of one side thereof, a detent device mounted in said outward extension for locking said latch assembly to a selected position axial of said steering column, and a manually operated latch for actuating said detent device to release said latch assembly for axial adjustment on said steering column, said detent device including a spring actuated element and a locking element movable between said engaged and disengaged positions by said spring actuated element such that when said latch assembly is engaged the angle of said steering column is fixed by said locked condition of said latch assembly at which a detent device engages said steering column.

2. An adjustable steering column assembly for vehicles having a hand wheel and steering column for steering the vehicle pivotally adjustable forwardly and rearwardly of the vehicle, a first pivot fixed in relation to the vehicle on which the steering column is mounted and about which it is adjustable, a second pivot located above the steering column and fixed in relation to the vehicle, and a third and movable pivot operatively connected to the steering column and connected to said second pivot by a swingable link, said third pivot being connected to a latch assembly which is mounted on the steering column and is slidable longitudinally thereof, said latch assembly including locking means movable between engaged and disengaged positions to lock said steering column in any one of a plurality of adjustment positions such that when said latch assembly is engaged the angle of said steering column is fixed by a locked condition of said latch assembly at which a detent device engages said steering column, said detent device comprising a spring actuated element and a locking element movable between said engaged and disengaged positions by said spring actuated element.

3. An adjustable steering column assembly as claimed in claim 2 wherein said spring actuated element comprises a tapered element, said locking element cooperating therewith and with a locking bar on said steering column, and a manually actuated element for actuating said spring actuated element to disengage said locking element from said locking bar.

4. An adjustable steering column assembly for vehicles having a hand wheel and steering column for steering the vehicle pivotally adjustable forwardly and rearwardly of the vehicle, a first pivot fixed in relation to the vehicle on which the steering column is mounted and about which it is adjustable, a second pivot located above the steering column and fixed in relation to the vehicle, and a third and movable pivot operatively connected to the steering column and connected to said second pivot by a swingable link, said third pivot being connected to a latch assembly which is mounted on the steering column and is slidable longitudinally thereof, said latch assembly including locking means movable between engaged and disengaged positions to lock said steering column in any one of a plurality of adjustment positions such that when said latch assembly is engaged the angle of said steering column is fixed by a locked condition of said latch assembly at which a detent device engages said steering column, said latch assembly including an operator operated reciprocating member for actuating said detent device.

5. An adjustable steering column assembly for vehicles having a hand wheel and steering column for steering the vehicle pivotally adjustable forwardly and rearwardly of the vehicle, a first pivot fixed in relation to the vehicle on which the steering column is mounted and about which it is adjustable, a second pivot located above the steering column and fixed in relation to the vehicle, and a third and movable pivot operatively connected to the steering column and connected to said second pivot by a swingable link, said third pivot being connected to a latch assembly which is mounted on the steering column and is slidable longitudinally thereof, said latch assembly including locking means movable between engaged and disengaged positions to lock said steering column in any one of a plurality of adjustment positions, said latch assembly including an operator operated reciprocating member for actuating said detent device locking means.

* * * * *